(12) United States Patent
Helmersson et al.

(10) Patent No.: US 7,970,093 B2
(45) Date of Patent: Jun. 28, 2011

(54) METHOD FOR OPERATING A NUCLEAR REACTOR

(75) Inventors: Sture Helmersson, Kolbäck (SE); Pär Beccau, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 169 days.

(21) Appl. No.: 10/569,860

(22) PCT Filed: Aug. 30, 2004

(86) PCT No.: PCT/SE2004/001244
§ 371 (c)(1),
(2), (4) Date: Feb. 27, 2006

(87) PCT Pub. No.: WO2005/022551
PCT Pub. Date: Mar. 10, 2005

(65) Prior Publication Data
US 2007/0002998 A1   Jan. 4, 2007

(30) Foreign Application Priority Data
Aug. 28, 2003   (SE) ...................................... 0302308

(51) Int. Cl.
*G21C 7/08* (2006.01)
*G21C 7/04* (2006.01)

(52) U.S. Cl. ........ 376/237; 376/219; 376/236; 376/260; 376/267

(58) Field of Classification Search .................. 376/237
See application file for complete search history.

(56) References Cited

U.S. PATENT DOCUMENTS

| | | | |
|---|---|---|---|
| 3,385,758 A | 5/1968 | Gyorey et al. | |
| 4,285,769 A | 8/1981 | Specker et al. | |
| 4,368,171 A | 1/1983 | Maruyama et al. | |
| 4,647,421 A * | 3/1987 | Ohashi et al. | 376/216 |
| 5,217,678 A | 6/1993 | Fukasawa | |
| 5,307,387 A | 4/1994 | Nakajima et al. | |
| 5,524,033 A * | 6/1996 | Hida et al. | 376/419 |
| 5,544,211 A * | 8/1996 | Haikawa et al. | 376/435 |
| 5,677,938 A | 10/1997 | Gassmann | |
| 6,504,889 B1 | 1/2003 | Narita et al. | |
| 7,231,333 B2 * | 6/2007 | Russell et al. | 703/6 |

* cited by examiner

*Primary Examiner* — Johannes P Mondt
(74) *Attorney, Agent, or Firm* — Michaud-Kinney Group LLP (57) ABSTRACT

The invention refers to a method for operating a nuclear light water reactor during an operation cycle including a cardinal cycle and a number of successive control rod cycles. The reactor includes a plurality of elongated fuel units containing a nuclear fuel in the form a fissible material, a burnable absorber, and a plurality of control rods introduceable in a respective control rod position. Substantially all control rods are introduced in the core before the reactor is started and an operation cycle is initiated. The reactor is operated during the cardinal cycle with a first control rod configuration with a first group of control rods at least partly introduced and the remaining control rods extracted. The reactor is operated during the subsequent control rod cycles with a respective control rod configuration which each includes a different group of control rods at least partly introduced, wherein the cardinal cycle is substantially longer than each of the subsequent control rod cycles.

3 Claims, 6 Drawing Sheets

METHOD FOR OPERATING A NUCLEAR REACTOR

CROSS-REFERENCE TO RELATED APPLICATIONS

This application is entitled to the benefit of and incorporates by reference essential subject matter disclosed in International Application No. PCT/SE2004/001244 filed on Aug. 30, 2004 and Swedish Patent Application No. 0302308-2 filed on Aug. 28, 2003.

FIELD OF THE INVENTION

The present invention refers generally to the operation and control of nuclear light water reactors. More precisely, the invention refers to the operation and control of nuclear light water reactors of boiling water type.

Especially, the present invention refers to a method for operating a nuclear light water reactor during an operation cycle including a cardinal cycle and a number of successive control rod cycles. An operation cycle is the time period during which the reactor is operating with the same core, i.e. without replacement or relocation of the fuel.

BACKGROUND OF THE INVENTION

A nuclear light water reactor of boiling water type includes a plurality of elongated fuel units, which contain fissible material, and a number of control rods. The fuel units may be designed as elongated fuel assemblies including a number of fuel rods each having a tubular cladding enclosing a pile of fissible fuel. In a boiling water reactor there is large number of such fuel assemblies, in the order of 400 to 800, and approximately a fourth of control rods, i.e. in the order of 100 to 200.

The fuel units are arranged in parallel to each other and grouped in a plurality of cells which each may include four fuel units. These cells form together the core of the reactor. Substantially each such cell in the core includes a control rod position. In each of these control rod positions, one of the control rods is completely or partly introduceble. The control rods contain neutron absorbing material, such as boron or hafnium, and are used in a boiling water reactor for controlling and interrupting the nuclear reaction in the fuel. When all control rods are introduced, the reactor is shut down, i.e. more neutrons than being released in the fission process will be absorbed and the nuclear reaction decays.

The fuel units, comprised in the core during an operation cycle, are different with regard to the amount of fissible material. This difference depends in the first place on the fact that the fuel units have been in operation during different time periods. A first type of fuel units may be the new ones thus including a relatively large amount of fissible material. A second type of fuel units may have a certain degree of burn out obtained during one or more preceding operation cycles in a reactor. This second type of fuel units thus includes a relatively smaller amount of fissible material. The fuel units may also from the beginning be designed with different amount and distribution of the fissible material.

During an operation cycle the different types of fuel units are arranged in such a way that they are distributed and mixed in the core. The fuel units containing new fuel are preferably located in the proximity of the centre of the core whereas the fuel units having the largest burn out degree, i.e. the smallest amount of fissible material, preferably are located in the proximity of the periphery of the core. This reduces the leakage of neutrons out from the core and is economically advantageous, but also result in a higher effect and greater thermal loads on the centrally located fuel.

The control rods may be divided into various groups, for instance shut down rods, which merely are introduced in the core when the reactor is shut down, and controlling control rods used for controlling the effect of the reactor. Before the reactor is started and an operation cycle is initiated, substantially all control rods are introduced in the core. When the operation cycle begins, a majority of the control rods, for instance about 90%, are extracted from the core. During normal operation of the reactor approximately a tenth of the control rods are thus completely or partly introduced in the core. The primary purpose with the controlling control rods, which are introduced during operation of the reactor, is to absorb excess reactivity in the core. The excess reactivity is built into the core to be successively consumed during the operation cycle, the length of which may vary significantly from less than 12 months to more than 24 months. A long operation cycle also requires correspondingly greater excess reactivity. Such an excess reactivity is accomplished by a larger part of the fuel being new and thus containing a higher concentration of fissible material.

A secondary function of the controlling control rods is to control the effect distribution in the core, partly in such a way that no thermal limits are locally exceeded and partly in such a way that the burn out of fissible material is distributed so that no locally high effects arises when the control rods at the end of the operation cycle have to be extracted when the excess reactivity decreases. It is then required that merely the distribution of the fissible material can control the effect distribution. In this controlling function the control rods co-act with the initial distribution of fissible material and burnable absorbers, see below, which is co-optimised with calculations before each new operation cycle.

The control rods are not themselves sufficient for absorbing all excess reactivity, especially not during operation cycles longer than 12 months. As a supplement burnable absorbers, for instance $Gd_2O_3$, which is fixedly included in the new fuel, are therefore provided. Such a burnable absorber is dimensioned to be burnt-out during the first operation cycle. The burnable absorbers also supplement the control of the effect distribution of the core.

The control rods may also be divided into different groups depending on with which cells they are intended to co-act. The control rods may then include first control rods, which co-act with cells with one or several of the first type of fuel units with relatively new fuel, and second control rods, which co-act with cells with the second type of fuel units with partly burn out fuel. The uneven concentration of fissible material in the core, which depends on the fact that the core includes fuel with different degree of burn out, creates problems when determining which control rods are to be introduced during various phases of the operation cycle. The fuel units, which are located most closely to an introduced control rod, will not be burnt-out to the same extent as the fuel units which are located at a distance from this control rod. The relatively small number of control rods in the core during operation thus leads successively to an increasing unevenness in the concentration of fissible material in the core. In addition, a relatively large effect increase is obtained in the fuel units located most closely to the actual control rod position immediately after the control rod has been extracted from the core. Such an effect increase can lead to so called PCI-defects (Pellet Cladding Interaction).

PCI, i.e. mechanical interaction between the pellet and the cladding, which via stress corrosion from fission products leads to a crack on the cladding from inside, is a now well investigated defect mechanism which is described in the specialist literature. For a defect to arise several conditions have to be obtained simultaneously:

1. The burn out is to be sufficiently high so that there is a sufficient amount of fission products, so that the cladding is irradiation hardened and so that there is mechanical contact between the pellet and the cladding. With the actual rod design this occurs at a burn out or 15-20 MWd/kgU. Approximately this is valid for about 60% of the core in the beginning of the operation cycle and for about 80% of the core at the end of the operation cycle.
2. The effect increase has to be so quick that the cladding material does not have time to creep and to reduce the stress level. At the first start after a reloading this is valid for a large part of the core, but the reloading is normally performed with the conditioning rules that have shown to be very efficient. During an operation cycle there are then only preconditions for sufficiently large and quick effect increases beside a controlling control rod that are manipulated during the operation cycle.
3. The end effect has to be sufficiently high, partly for the same reasons as for point 1.
4. The high stress level has to be maintained during a sufficiently long time period in order to permit the stress corrosion to act. From tests the required time period is judged to be from a 10 minutes to several hours. Sufficient durability (holding time) is always present in connection with stationary operation, however not at transients.
5. To these conditions it should also be added that local defect notches from, for instance pellet fragments from the manufacturing or cracking during operation, appear to be necessary. Both operation experiences and ramp tests show a significant distribution which hardly may be explained in any other way.

These conditions are well proved empirically and PCI is generally regarded as an eliminated defect cause through more careful operation rules with slow effect increase (conditioning), through decreased longitudinal heat load (more and thinner fuel rods) and through different variants of Zr-liners (inner layer of soft, low-alloyed Zr on the inner side of the cladding tube). No protection is however 100% safe and it is important to introduce new operation modes in such a way that the risks are not unnecessarily increased. In this context it is also important to note that the PCI-stresses are significantly higher at the extraction of the control rods than at the introduction. The difference may be a factor 10.

The fuel units beside the control rods does not only obtain a lower average burn out but also a skewed burn out since the fuel rods most closely to the control rods are burnt-out very slowly whereas fissible plutonium is generated at a substantially normal degree in these fuel rods. When the control rod is extracted after a long time period of operation, a skewed distribution of fissible material has thus been formed with a corresponding skewed effect distribution as a result, which means that the thermal margin is deteriorated.

These problems may according to the prior art be solved in various ways. According to one known method one may during an operation cycle change the control rod configuration at relatively short intervals according to a predetermined sequence. Such a method is suggested in U.S. Pat. No. 3,385,758.

A disadvantage of this known solution is that after a certain time of the operation cycle it may be difficult to find new control rod configurations with suitable positions for the control rods. Several disadvantages with this known method are described in U.S. Pat. No. 4,285,769, for instance that the reactor effect has to be decreased at each change of the control rod configuration. The factor of capacity, i.e. the average effect production capability of the reactor is decreased.

U.S. Pat. No. 4,285,769 instead suggests that the core is divided into two different types of cells. The first type contains fuel assemblies with relatively new fuel with high reactivity and the second type contains fuel assemblies with partly burnt-out fuel with low reactivity. According to the method defined in U.S. Pat. No. 4,285,769 no control rods are introduced in the cells of the first type but all control takes place in that the control rods are introduced into a part of the cells of the second type. In such a way at least a part of the previously necessary control rod movements may be avoided.

These known methods for controlling the control rods during operation are insufficient when the operation cycles become longer. They have been excellent at the relatively short operation cycles which previously have been used, i.e. an operation cycle of up to 1 year or in a best case in certain applications up to 1.5 years. It is now more common with longer operation cycles, i.e. up to 2 years. At such operation cycles with correspondingly higher excess reactivity new strategies are required for controlling the control rods.

Further examples of control rod strategies are described in the following documents.

U.S. Pat. No. 4,368,171 describes a method for controlling a nuclear reactor by means of control rods in order to obtain a more uniform radial effect distribution. The control rods are divided into different groups at different radial distance from the centre of the core.

U.S. Pat. No. 5,217,678 describes another method for controlling a nuclear reactor by means of control rods which are positionable in different control rod patterns. This known method concerns the control of the control rods during change from one control rod pattern to another control rod pattern.

U.S. Pat. No. 5,307,387 describes a method for loading fuel assemblies in a core in a reactor. The method is characterised in that peripherally located fuel assemblies are positioned in a central part of the core after at least two operation cycles.

U.S. Pat. No. 5,677,938 describes a further method for operating a nuclear reactor. The core is divided into a central area, an intermediate area and a peripheral area. The control rods are grouped in different groups which each is distributed over the whole core. The different control rod groups are introduced after each other at least partly in the core during a desired time interval. This time interval is equally long for all control rod groups.

SUMMARY OF THE INVENTION

The object of the present invention is an improved method for operating and controlling a nuclear reactor. A further object is a method for operating and controlling a nuclear plant by means of relatively long operation cycles. A still further object is a method for operating and controlling a nuclear reactor in such a way that the above mentioned skewed distribution after a certain time of the operation cycle may be avoided.

This object is achieved by the method defined in claim 1.

According to the proposed method the two previously known ways of controlling the control rods are combined in such a way that initially some of the control rods are permitted to be introduced during a relatively large part, for instance 40-60% or 10-15 months, of the whole time of the operation cycle. This period is in the following called the cardinal sequence or the cardinal cycle. Thereafter a more active control and movement of the control rods is applied, i.e. one starts to change control rod configuration relatively frequently, for instance every second month. By the method according to the invention the total number of control rod movements may thus be kept at a relatively low level, which contributes to a reduced risk for fuel defects. Furthermore, a relatively small number of control rod movements is advantageous since the effect has to be reduced in connection with the change of control rod configuration and this leads to a decreased factor of capacity. A further advantage is the increased possibility to find new suitable control rod positions for each new control rod cycle.

Further advantages with the method according to the invention is that it is possible to keep the problems, connected to the skewed distribution of the reactivity that arises at the fuel units adjoining introduced control rods, at a low level.

According to a further development of the method according to the invention the successive control rod cycles, i.e. the control rod cycles after the cardinal cycle, include: operating the reactor during the first of the subsequent control rod cycles with a second control rod configuration with the first group of control rods extracted and a second group of control rods at least partly introduced, and operating the reactor during a second of the subsequent control rod cycles with a third control rod configuration with the second group of control rods extracted and a third group of control rods at least partly introduced. Furthermore, the subsequent control rod cycles may also include: operating the reactor during a third of the subsequent control rod cycles with a fourth control rod configuration with the third group of control rods extracted and a fourth group of control rods at least partly introduced, operating the reactor during a fourth of the subsequent control rod cycles with a fifth control rod configuration with the fourth group of control rods extracted and a fifth group of control rods at least partly introduced, etc.

The reactivity loss from the burning out of merely the fissible material is typically 1-1.2 reactivity percent per MWd/kgU and would require a quick control rod extraction as a compensation. During the cardinal cycle the control rods are to be moved relatively moderately in order to obtain the advantages and, preferably, they are to be introduced. This requires that the control rod dependent addition of burnable absorbers is dimensioned and distributed in such a way that they are burnt-out at a somewhat higher speed than the fissible material. A desired netto effect is a slightly increasing reactivity at 0.1-0.3 reactivity percent per MWd/kgU which thus in a convenient manner may be compensated by a slow introduction of control rods during the cardinal cycle.

According to a further development of the method according to the invention the fuel includes uranium-235 and uranium-238, wherein the amount of uranium-235 in relation to the amount of uranium-238 is defined as the degree of enrichment of the fuel and wherein at least the first fuel units, which adjoin the control rods in the first group, have a control rod dependent modification of the degree of enrichment. In such a way the fuel units may initially be designed with a compensating skewed distribution of the amount of fissible material. It is thus possible to compensate for the skewed distribution of the reactivity following the fact that a control rod has been introduced during a relatively long time in the proximity of a fuel unit. Advantageously, the control rod dependent degree of enrichment may be such that the fuel rods, which are located in the proximity of the control rods in the first group have a reduced degree of enrichment. Furthermore, the core may have an average of degree of enrichment calculated on all fuel units. Said reduced degree of enrichment may then be at least 0.1% U-235 or at least 0.5% U-235 in the immediate proximity of the control rod.

According to a further development of the method according to the invention, the modified degree of enrichment is such that the degree of enrichment of the fuel units, which adjoin the control rods in the first group, increases with an increasing distance from in the proximity of a centre of the control rod from said reduced degree of enrichment of the fuel rods located most closely to the control rod to the average degree of enrichment.

According to a further development of the method according to the invention, the fuel units, which adjoin the control rods in the first group, have said control rod dependent addition of burnable absorber that has a capability of absorbing thermal neutrons. Said burnable absorber is consumed during the operation of the reactor. In such a way one may compensate for the increasing reactivity arising when the control rod is extracted due to the fact that plutonium has been generated and uranium-235 has not been consumed during the time during which the control rod was completely or partly introduced. The burnable absorber in the fuel rod will reduce the nuclear reaction until the absorber has been consumed. Said addition of burnable absorber is such that the burnable absorber in each of the fuel units located immediately beside a control rod in the first group is distributed on some of the fuel rods. Advantageously, said addition of burnable absorber may be distributed on 2 to 6 of the fuel rods. Furthermore, the fuel rods on which the control rod dependent addition of burnable absorber is distributed are located immediately beside a control rod in the first group.

According to a further development of the method according to the invention, the operation cycle is at least 15 months, preferably at least 18 months and more preferably at least 24 months.

BRIEF DESCRIPTION OF THE DRAWINGS

The present invention is now to be explained more closely through a description of an embodiment and with reference to the drawings attached.

DETAILED DESCRIPTION OF AN EMBODIMENT OF THE INVENTION

Figure 1:
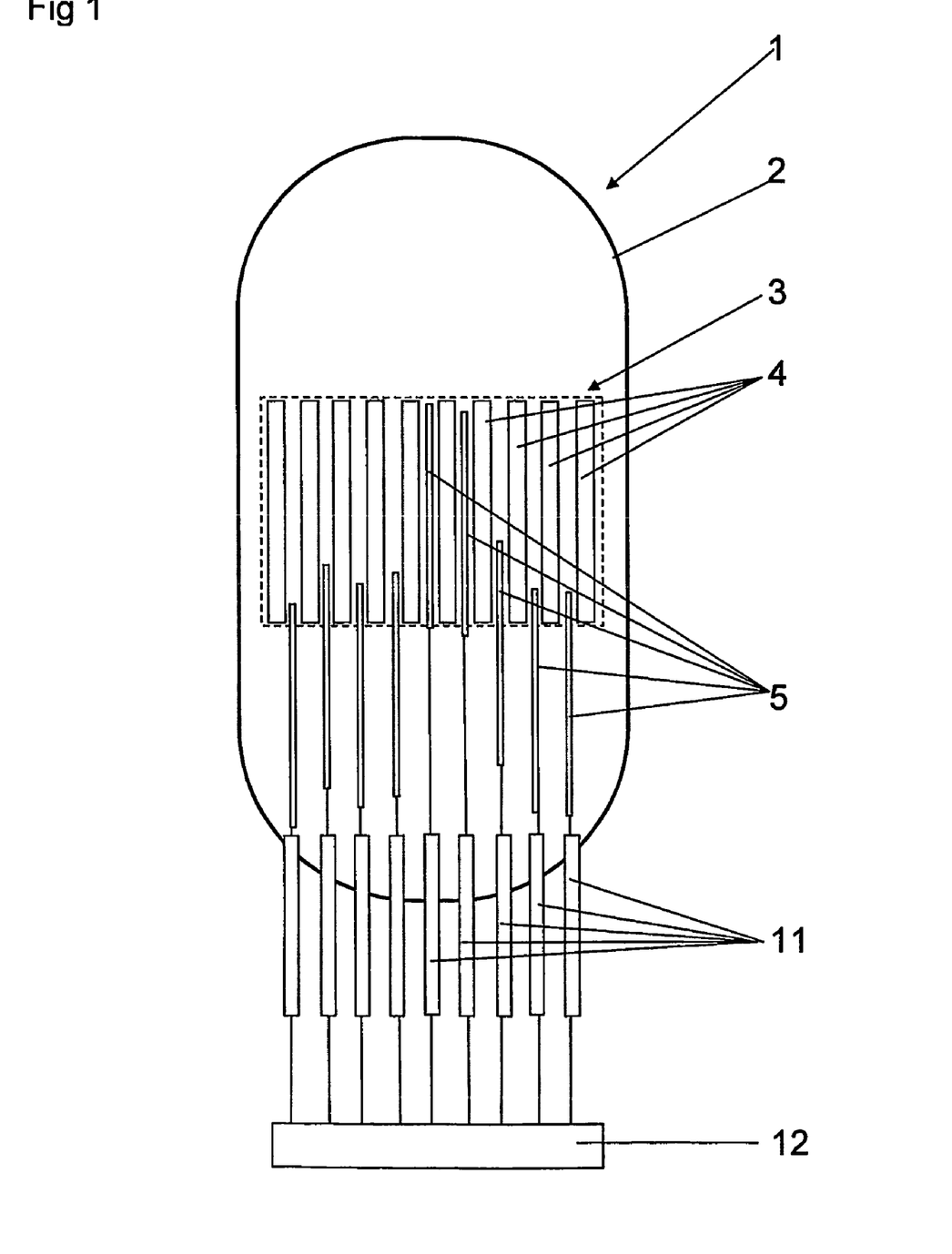
FIG. 1 discloses schematically a view of a substantially vertical section through a nuclear reactor of a boiling water type FIG. 2 discloses schematically a view of a substantially horizontal section through a nuclear reactor of a boiling water type FIG. 3 discloses schematically a view of a substantially horizontal section through a fuel unit for the nuclear reactor in FIGS. 1 and 2
Figure 2:
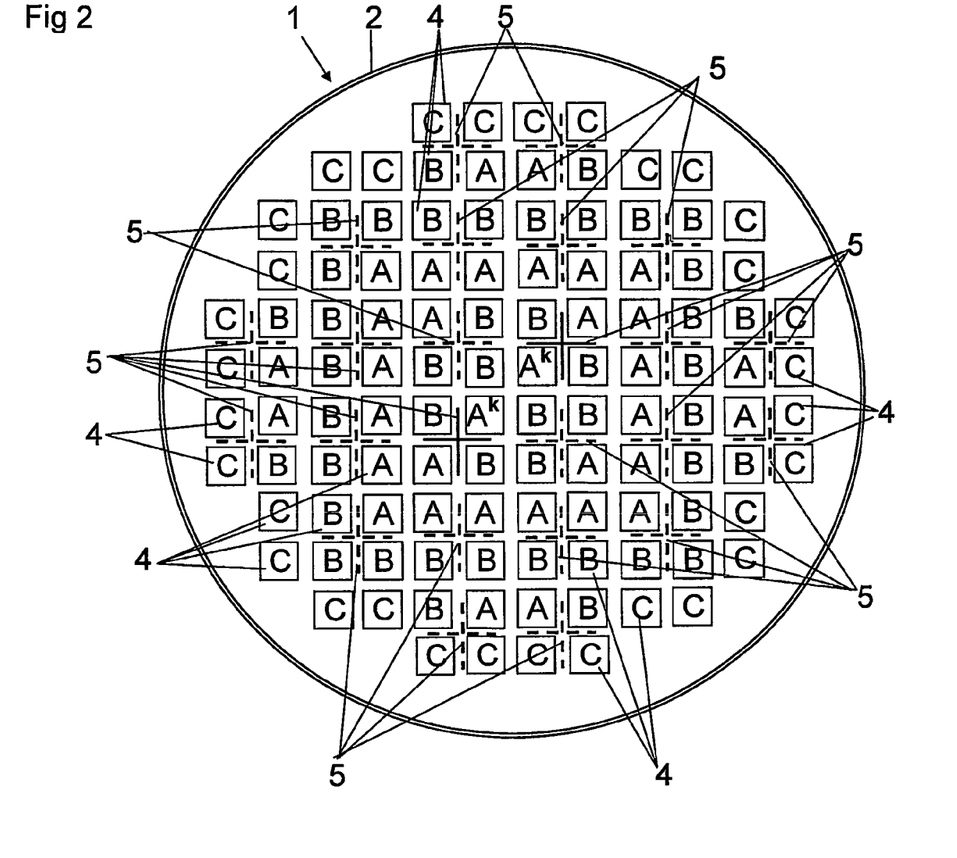
Figure 3:
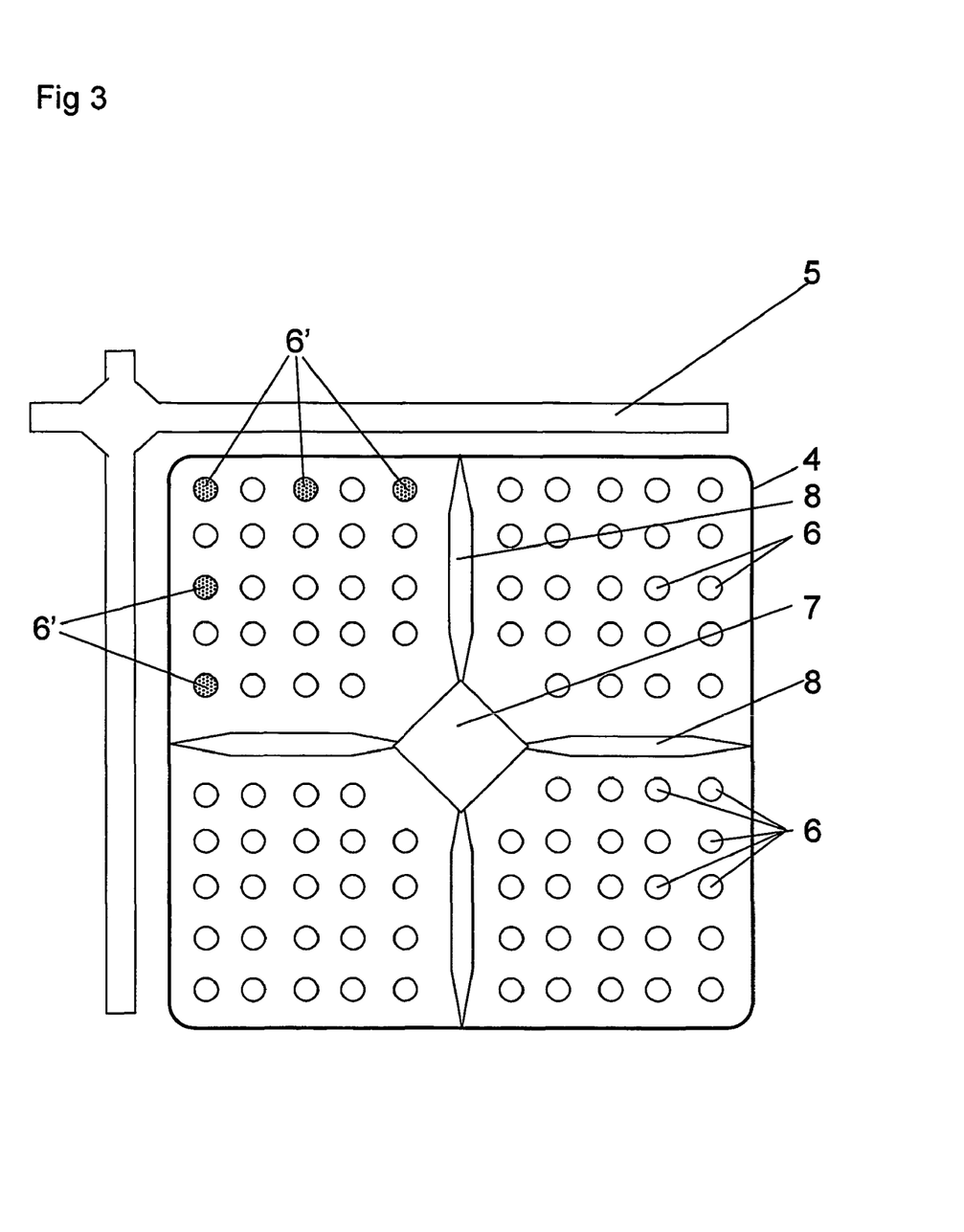

FIGS. 1 and 2 disclose a nuclear light water reactor 1 of a boiling water type. The reactor 1 includes a reactor vessel 2 enclosing a core 3. The core includes a plurality of elongated fuel units 4 and a plurality of control rods 5. The fuel units 4, see FIG. 3, are in the embodiment disclosed designed as elongated so called fuel assemblies which each includes a number of fuel rods 6. Each fuel rod 6 has a tubular cladding enclosing a pile of fissible material in the form of so called fuel pellets. In the embodiment disclosed each fuel unit 4 may in a manner known per se also include a central water channel 7 and four thin water channels 8 dividing the fuel units 4 into four smaller longitudinal units, which each forms a part space arranged to receive a respective bundle of fuel rods 6.

In a boiling water reactor there is a large number of such fuel units 4, in the order of 400 to 800, and approximately a fourth of that order of control rods 5, i.e. in the order of 100 to 200. For the purpose of illustration, FIGS. 1 and 2 thus disclose a reduced number of fuel units 4 and control rods 5. The fuel units 4 are arranged in parallel to each other and grouped in a plurality of cells which each may include four fuel units 4. Substantially each such cell includes a control rod position in which a respective control rod 5 is completely or partly introduceable by means of a respective drive member 11. The control rods 5 contain neutron absorbing material, such as boron or hafnium, and are used in a boiling water reactor for controlling and interrupting the nuclear reaction in the fuel. The drive members 11, which are controlled by means of a schematically disclosed control unit 12, are arranged to position the respective control rod 5 in an extracted position, see the two outer control rods in FIG. 1, or in a completely or partly introduced position.

The fuel in the fuel rods 6 in the fuel units 4 includes uranium-235 and uranium-238. The amount of uranium-235 in relation to the amount of uranium-238 is defined as the degree of enrichment of the fuel. The fuel units 4, which are included in the core 3 during an operation cycle, are different with regard to the amount of fissible material, i.e. have different degree of enrichment. This difference depends in the first place on the fact that the fuel units 4 have been in operation during differently long time periods. The first type of fuel units 4 may be new and thus include a relatively large amount of fissible material. These fuel units have been designated with A in FIG. 2 and are preferably positioned in the proximity of the centre of the core 3. The second type of fuel units 4 may have a certain degree of burn out obtained during one or more previous operation cycles in a reactor. This second type of fuel units 4 thus has a lower degree of enrichment and includes a relatively smaller amount of fissible material. These fuel units 4 have been designated with B and C in FIG. 2 and are preferably positioned in the proximity of the periphery of the core 3, wherein the fuel units B has a higher degree of enrichment than the fuel units C.

The fuel units 4 may also from the beginning be designed with different amount and distribution of the fissible material. For instance, one or several of the fuel units 4 which adjoin an introduced control rod 4 may have an initially reduced degree of enrichment at least in the immediate proximity of the respective control rod 5. This control rod dependent modification of the degree of enrichment may be at least 0.5 percent below an average degree of enrichment calculated on all fuel units 4 in the core 3. The control rod dependent modification of the degree of enrichment of the fuel units 4, which adjoin an introduced control rod 5, is such that the degree of enrichment increases with increasing distance from in the proximity of the centre of the control rod from said reduced degree of enrichment of the fuel rods 6, which are located most closely to the control rod 5, to the average degree of enrichment.

Figure 4:
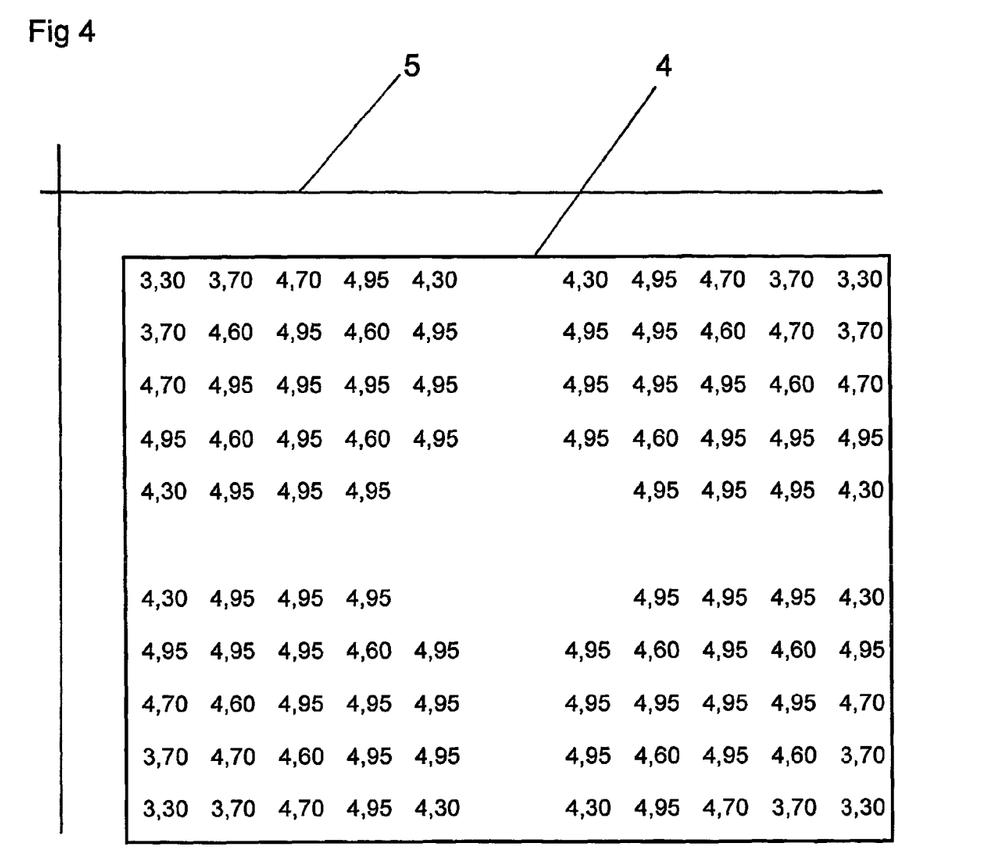
FIG. 4 discloses schematically a normal distribution of fissible material in the fuel unit in FIG. 3
Figure 5:
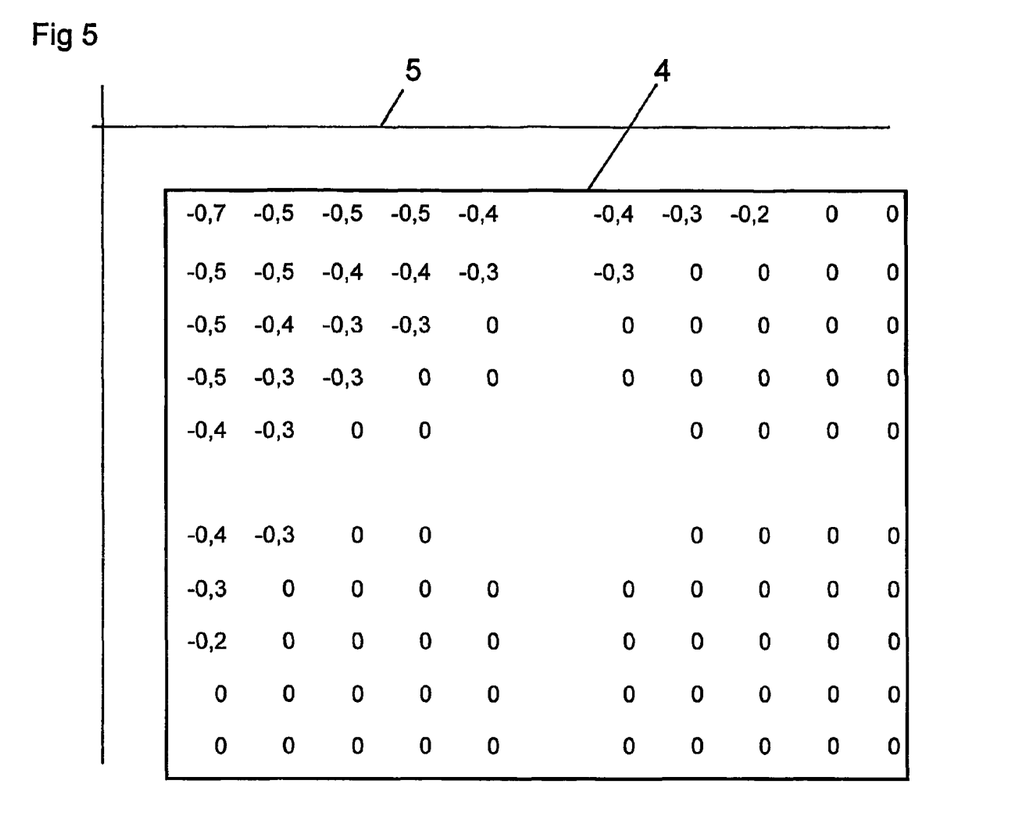
FIG. 5 discloses schematically an imaginable modification of the normal distribution of fissible material in the fuel unit in FIG. 3
Figure 6:
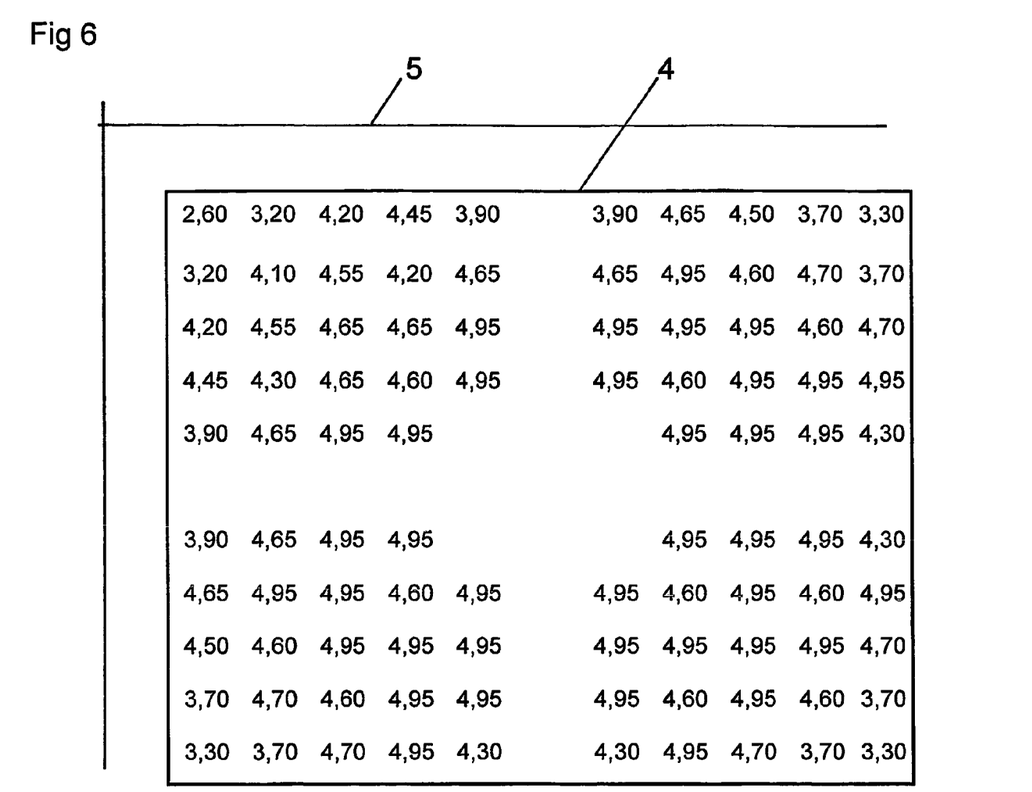
FIG. 6 discloses schematically the resulting distribution of fissible material in the fuel assembly in FIG. 3.

FIG. 4 discloses the distribution of the enrichment in a fuel unit 4 with 96 fuel rods 6 in a normal case. This normal distribution is symmetric and used for most of the fuel units 4 in the core 3. FIG. 5 discloses a control rod dependent modification of the enrichment, which modification may be applied on the distribution in FIG. 4. FIG. 6 discloses a resulting control rod dependent distribution of the enrichment. This control rod dependent modification thus leads to an asymmetric distribution of the enrichment, which may be used for the fuel units 4, which are located immediately beside a control rod 5 introduced during the cardinal cycle, i.e. at least a part of the fuel units 4 that has been designated by A in FIG. 2. As appears from FIGS. 5 and 6, the enrichment is lower in the fuel rods 6 located in the proximity of the control rod 5.

FIG. 4 discloses a symmetric distribution of the enrichment. It is common in reactors where this normal distribution of the enrichment is asymmetric from the beginning due to the asymmetrically arranged water gaps around the fuel units 4. The invention may still be applied in such a case simply by superposing the further asymmetrical control rod dependent modification of the enrichment according to FIG. 5.

It is previously known to let at least some of fuel units 4 in the core include a certain amount of a burnable absorber for absorbing a part of the excess reactivity of the core 3. The burnable absorber, which has a capability of absorbing thermal neutrons, may for instance consist of $Gd_2O_3$. According to this invention, the fuel units 4, which have been designated by A in FIG. 2 and adjoin an introduced control rod 5, include, in addition to the above mentioned amount of burnable absorber, a control rod dependent addition or a raised content of burnable absorber. This addition is preferably distributed on some of the fuel rods 6', which are located in immediate proximity of this control rod 5. The control rods 6, which are included by the expression, "in immediate proximity of the control rod" can be seen in FIG. 5, i.e. it is the rods which according to the invention have a control rod dependent reduction of the enrichment. Advantageously, the control rod dependent addition of burnable absorber may be distributed on a relatively small number of fuel rods 6' in the actual fuel units 4, for instance on 2, 3, 4, 5, 6 or 7 fuel rods 6'. FIG. 4 discloses a fuel unit 54 with 5 such fuel rods 6'. The reactor disclosed may according to the invention be operated in the following manner. Before the reactor 1 is started and an operation cycle is initiated, substantially all control rods 5 are introduced in the core 3. Thereafter the reactor 1 is started by means of an extraction of substantially all control rods 5 except for a first group of control rods 5 which are at least partly introduced in the core 3. This initial control rod cycle, which is called the cardinal cycle, continues during a relatively long time, for instance 10-15 months or approximately 40-60% of the total time of the operation cycle. The total operation cycle is relatively long and may be at least 15 months, at least 18 months, at least 21 months, at least 24 months, at least 27 months or more. An operation cycle of for instance 24 months permits with today's reactor technology an effect output of 15-20 GW d/t.

During the cardinal cycle, substantially no or merely small control rod movements take place and then, preferably, introduction of control rods. After the cardinal cycle, the reactor 1 is operated during a number of subsequent control rod cycles with a respective control rod configuration during which different groups of control rods 5 are at least partly introduced. Each of the subsequent control rod cycles are substantially shorter than the cardinal cycle.

During a first of the subsequent control rod cycles, the reactor 1 is operated with a second control rod configuration, wherein the first group of control rods 5 are extracted and a second group of control rods 5 are at least partly introduced. During a second of the subsequent control rod cycles, the reactor 1 is operated with a third control rod configuration, wherein the second group of control rods 5 are extracted and a third group of control rods 5 are at least partly introduced. During a third of the subsequent control rod cycles, the reactor 1 is operated with a fourth control rod configuration, wherein the third group of control rods 5 are extracted and a fourth group of control rods 5 are at least partly introduced. During a fourth of the subsequent control rod cycles, the reactor 1 is operated with a fifth control rod configuration, wherein the fourth group of control rods 5 is extracted and a fifth group of control rods 5 is at least partly introduced. It is to be noted that individual control rods 5 may be included in one or more of the above mentioned control rod groups.

The first group of control rods 5 may include some of the centrally located control rods 5. These control rods 5, which thus are completely or partly introduced during the cardinal cycle, have in FIG. 2 been drawn with continuous lines whereas the remaining control rods 5 have been drawn with dashed lines. These control rods 5 are located in cells including fuel units 4 with new fuel. This has been exemplified in FIG. 2 in that each of the cells includes two fuel units A and two fuel units B. The four of these fuel units 4 designated by A may have the above mentioned control rod dependent addition of burnable absorber, which is distributed on the fuel rods 6' located immediately beside the two control rods 5 drawn by continuous lines. Two of these fuel units 4 have been designated by $A^k$, i.e. these fuel units 4 constitute cardinal fuel units that may have the control rod dependent, reduced, skewed distribution of enrichment disclosed in FIG. 6.

The invention is not limited to the embodiment disclosed but may be varied and modified within the scoop of the following claims.

The invention claimed is:

1. A method for operating a nuclear light water reactor during an operation cycle including an initial control rod cycle and a plurality of subsequent control rod cycles following successively after the initial control rod cycle, said reactor comprising a core, said core comprising
a plurality of cells each including four elongated fuel units and a control rod position, said elongated fuel units being arranged in parallel with each other and each including a plurality of fuel rods containing a nuclear fuel in the form of fissile material,
a plurality of control rods, each of said cells including a control rod position, each of said control rods being introduceable in a respective one of said control rod positions, and at least some of said fuel units including a control rod dependent addition of a burnable absorber, said method comprising:
introducing substantially all of said control rods in the core before the reactor is started and an operation cycle is initiated,
operating the reactor during said operating cycle without replacement or relocation of said fuel units, wherein the operation cycle is at least 18 months,
operating the reactor during the initial control rod cycle of said operation cycle with a first control rod configuration with a first group of control rods at least partly introduced and the control rods other than those of the first group extracted,
maintaining the control rods in position with substantially no movements thereof during the initial control rod cycle,
operating the reactor during a first of the subsequent control rod cycles with a second control rod configuration with the first group of control rods extracted and a second group of control rods at least partly introduced; and
operating the reactor during a second of the subsequent control rod cycles with a third control rod configuration with the second group of control rods extracted and a third group of control rods at least partly introduced;
wherein the initial control rod cycle is significantly longer than each of the subsequent control rod cycles.

2. A method according to claim 1, wherein the subsequent control rod cycles also include:
operating the reactor during a third of the subsequent control rod cycles with a fourth control rod configuration with the third group of control rods extracted and a fourth group of control rods at least partly introduced.

3. A method according to claim 2, wherein the subsequent control rod cycles also include:
operating the reactor during a fourth of the subsequent control rod cycles with a fifth control rod configuration with the fourth group of control rods extracted and a fifth group of control rods at least partly introduced.

* * * * *